(12) United States Patent
Clausen

(10) Patent No.: US 8,047,583 B2
(45) Date of Patent: Nov. 1, 2011

(54) SPLIT HANDLE FOR AIRCRAFT DOOR

(75) Inventor: Charles Clausen, La Conner, WA (US)

(73) Assignee: B/E Aerospace, Inc., Wellington, FL (US)

( * ) Notice: Subject to any disclaimer, the term of this patent is extended or adjusted under 35 U.S.C. 154(b) by 1049 days.

(21) Appl. No.: 11/906,865

(22) Filed: Oct. 4, 2007

(65) Prior Publication Data

US 2009/0108133 A1    Apr. 30, 2009

(51) Int. Cl.
*E05B 3/00* (2006.01)
*B64C 1/00* (2006.01)

(52) U.S. Cl. ............. 292/336.3; 244/129.1; 244/129.5

(58) Field of Classification Search ............... 292/336.3; 244/129.1, 129.5
See application file for complete search history.

(56) References Cited

U.S. PATENT DOCUMENTS

| | | | |
|---|---|---|---|
| 448,379 A * | 3/1891 | Sorensen | 292/336.3 |
| 1,059,952 A * | 4/1913 | Spooner | 292/336.3 |
| 2,219,626 A * | 10/1940 | Johnson | 74/535 |
| 2,479,256 A * | 8/1949 | Radcliffe | 292/165 |
| 3,647,169 A | 3/1972 | Allwright et al. | |
| 3,858,921 A * | 1/1975 | Kuki | 292/336.3 |
| 3,967,844 A * | 7/1976 | Torii et al. | 292/336.3 |
| 4,042,193 A | 8/1977 | Cerne | |
| 4,510,714 A | 4/1985 | Kasper et al. | |
| 4,510,779 A | 4/1985 | Ahad | |
| 4,552,326 A | 11/1985 | Bokalot | |
| 4,560,123 A | 12/1985 | Sealey et al. | |
| 4,720,065 A | 1/1988 | Hamatani | |
| 4,889,213 A | 12/1989 | Roller | |
| 4,944,473 A | 7/1990 | Kallies et al. | |
| 5,031,863 A | 7/1991 | Noble | |
| 5,156,359 A * | 10/1992 | Noble et al. | 244/129.4 |
| 5,305,969 A | 4/1994 | Odell et al. | |
| 5,337,977 A | 8/1994 | Fleming et al. | |
| 5,577,781 A | 11/1996 | Kallies et al. | |
| 5,636,814 A | 6/1997 | Rollert | |
| 5,823,473 A | 10/1998 | Odell et al. | |
| 6,095,294 A | 8/2000 | McGourthy, Sr. et al. | |
| 6,109,563 A | 8/2000 | Verhoeven et al. | |
| 6,116,542 A | 9/2000 | Erben | |
| 6,168,114 B1 | 1/2001 | Erben | |
| 6,454,210 B1 | 9/2002 | Plattner | |
| 6,457,674 B2 | 10/2002 | Erben et al. | |
| 6,619,591 B2 | 9/2003 | Erben et al. | |
| 6,691,953 B2 | 2/2004 | Leclerc | |
| 6,951,320 B2 | 10/2005 | Buchs et al. | |
| 6,997,414 B2 | 2/2006 | Paradis | |
| 7,152,893 B2 * | 12/2006 | Pudney | 292/336.3 |

(Continued)

FOREIGN PATENT DOCUMENTS

EP    1 457 103 A1    9/2004

(Continued)

*Primary Examiner* — Carlos Lugo
(74) *Attorney, Agent, or Firm* — Drinker Biddle & Reath LLP

(57) ABSTRACT

A handle for use in operating a door of an aircraft. The handle is fixed to a shaft and rotates the shaft about an axis. The handle includes multiple separately movable sections, the sections arranged so that each section has a limited range of movement separate from the other. The handle is capable of operating the door when the sections are moved substantially in unison. The handle also provides positive actuation of movable door components.

22 Claims, 17 Drawing Sheets

U.S. PATENT DOCUMENTS 7,552,954 B2 * 6/2009 Rozo et al. ................. 292/336.3

FOREIGN PATENT DOCUMENTS

| | | | |
|---|---|---|---|
| EP | 0 992 426 B1 | 12/2004 |
| GB | 2 332 705 A | 6/1999 |
| WO | WO 00/76841 A1 | 12/2000 |
| WO | WO 2007/012774 A2 | 2/2007 |

* cited by examiner

SPLIT HANDLE FOR AIRCRAFT DOOR

FIELD OF THE INVENTION

The present invention relates generally to a handle for an aircraft external door, and more particularly to a handle that controls latching and locking mechanisms for such a door, and which has a safety mechanism to prevent the door from being opened inadvertently.

BACKGROUND OF THE INVENTION

It is known to provide an external door for accessing the interior of an aircraft fuselage, particularly for loading and unloading the cargo area of the aircraft. Some of these doors incorporate vents to equalize air pressure across the door before opening. Often, these vents are passively actuated by a spring, and therefore can malfunction due to icing or other adverse conditions. Other doors do not feature vents, creating a potentially dangerous situation in which a pressure differential exists across the door when it is opened. This pressure differential can cause the door to open suddenly and uncontrollably, creating a risk of injury or death to an operator. Also, many doors incorporate venting and latching systems that are each operated with a dedicated handle, thus requiring two hands, or at least two motions, to open. Use of separate handles leaves open the possibility that an operator may fail to secure one or the other in preparation for takeoff. Additionally, the use of separate handles leaves open the possibility that one handle may be inadvertently operated, diminishing the security of the door, and creating a danger that the door may open unintentionally. Still other doors are operable using one handle, but open via translating-motion, which is suitable for a passenger access point but not desirable for accessing a cargo area.

A need, therefore, exists for an aircraft door handle that provides safeguards against unintended or uncontrolled opening of the door, provides a positive-drive mechanism for controlling the venting of pressure across the door, ensures the security of the door prior to takeoff, and eases operation of the door.

BRIEF DESCRIPTION OF THE DRAWINGS

Exemplary embodiments of the invention described herein are shown in the attached drawings. It is understood, however, that the invention is not limited to the precise arrangements and constructions particularly shown. In the drawings.

DETAILED DESCRIPTION OF THE EMBODIMENTS

Figure 1A:
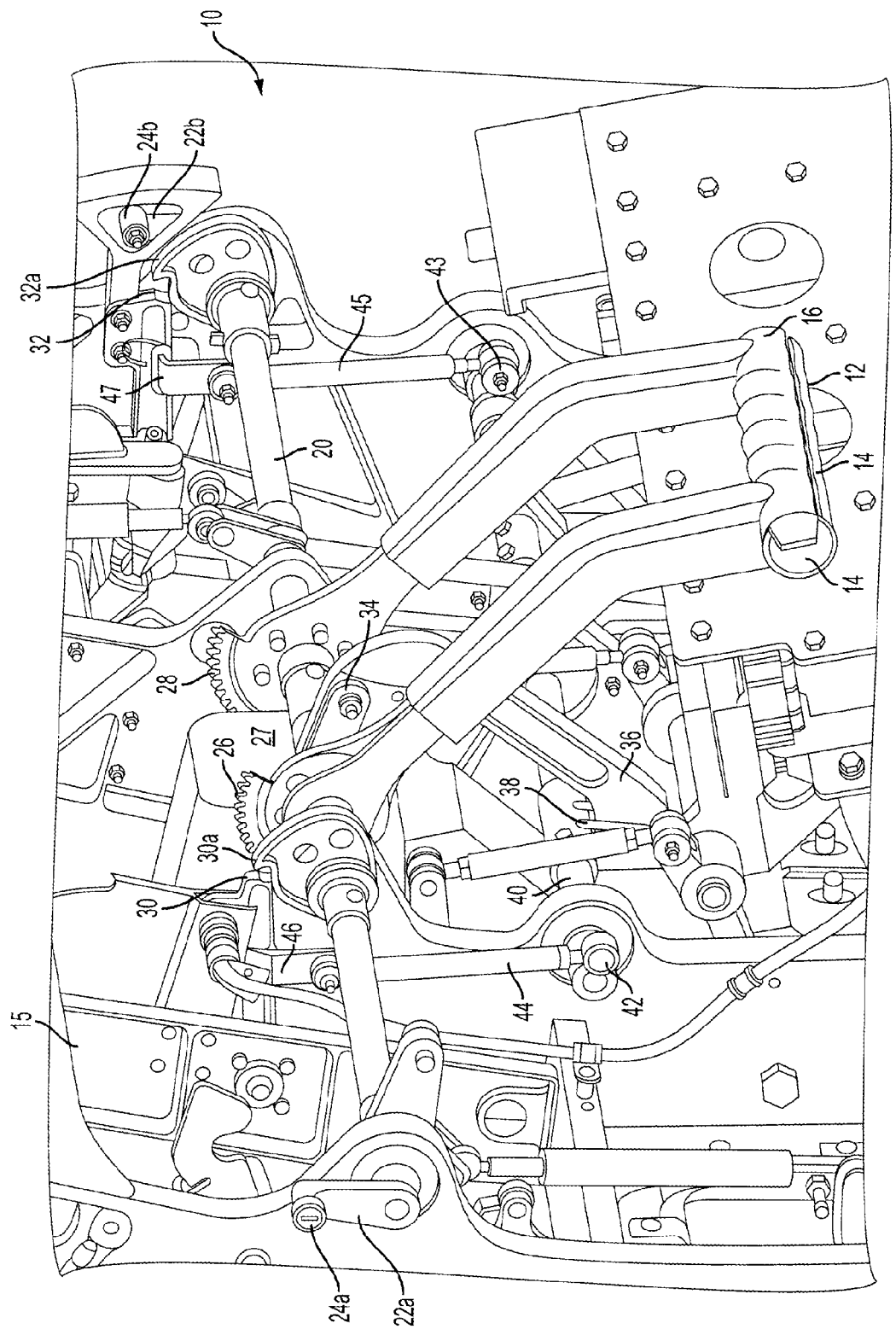
FIG. 1A is an isometric view of a handle and shaft assembly according to an embodiment of the present invention, shown with the surrounding structure of the door.

The exemplary embodiments of the invention described herein relate to a handle assembly for operating an aircraft door. The handle includes multiple separately-movable sections, and is attached to a shaft. The handle sections or shaft may also be attached to one or more actuators that drive at least one movable component of the door. In the example, the shaft includes one or more lock arms and one or more latching mechanisms attached to the shaft. A section of the handle is linked to pivoting locks mounted on the door and disposed to engage the lock arms. In the example, the handle includes multiple sections that may be moved together or independently, including a lower locking section and an upper latching or actuating section. The latching or actuating section of the handle is fixed to the shaft, while the locking section is linked to the pivoting locks on the door. Also in the example, the actuators can be sector gears fixed to the sections of the handle, and the gears can drive the vent door actuating mechanisms.

The shaft in this example is rotated by the handle's movement in a vertically-oriented arc. In a closed position in which the door is latched and locked, the latching mechanisms are engaged with the structure of the aircraft, preventing the door from opening. Also, the door locks are each aligned with the path of travel of a lock arm, and the actuators are not engaged with the vent door actuators. An operator opens the door by grasping both sections of the handle and pulling upwards in a vertical direction. As the handle is moved, linkages connected to the handle's locking section pivot the door locks into a disengaged position, allowing the shaft to rotate. As the shaft rotates, the actuators engage the vent door actuators, the latching mechanisms are disengaged from the aircraft structure, and the door is able to be opened. In the example, if only the latching section is rotated, the door locks will interfere with the rotation of the lock arms on the shaft as the shaft begins to rotate. By contrast, if both sections of the handle are rotated together, the movement of the locking section will cause the door locks to move into disengaged positions in which they will not interfere with the motion of the lock arms.

Referring now to the drawings which illustrate several preferred embodiments of the invention, a latching/locking apparatus is shown for an aircraft door.

Figure 2A:
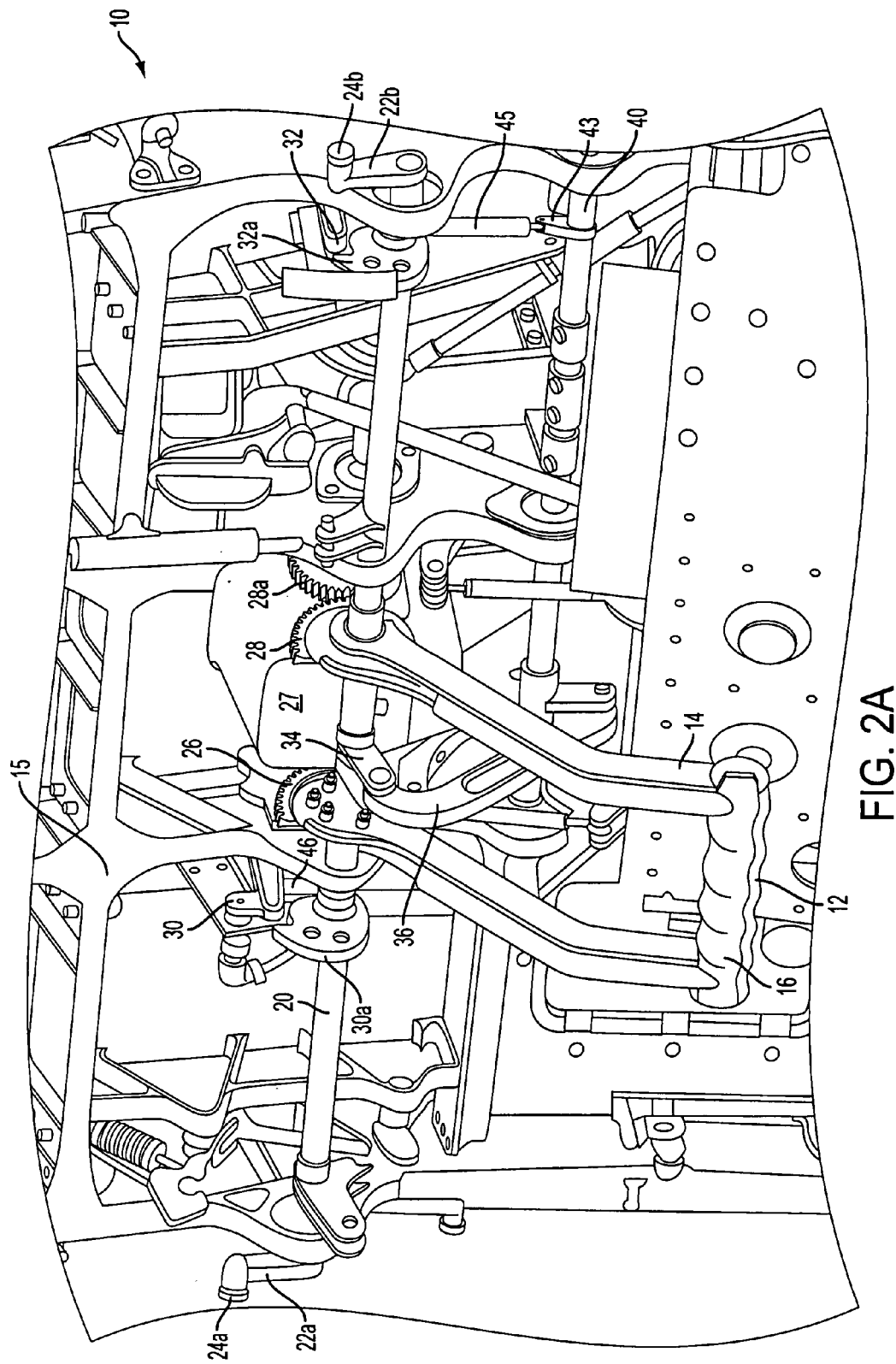
FIG. 2A is an isometric view of the handle and shaft assembly from the opposite side from FIG. 1A, shown with the surrounding structure of the door.
Figure 7:
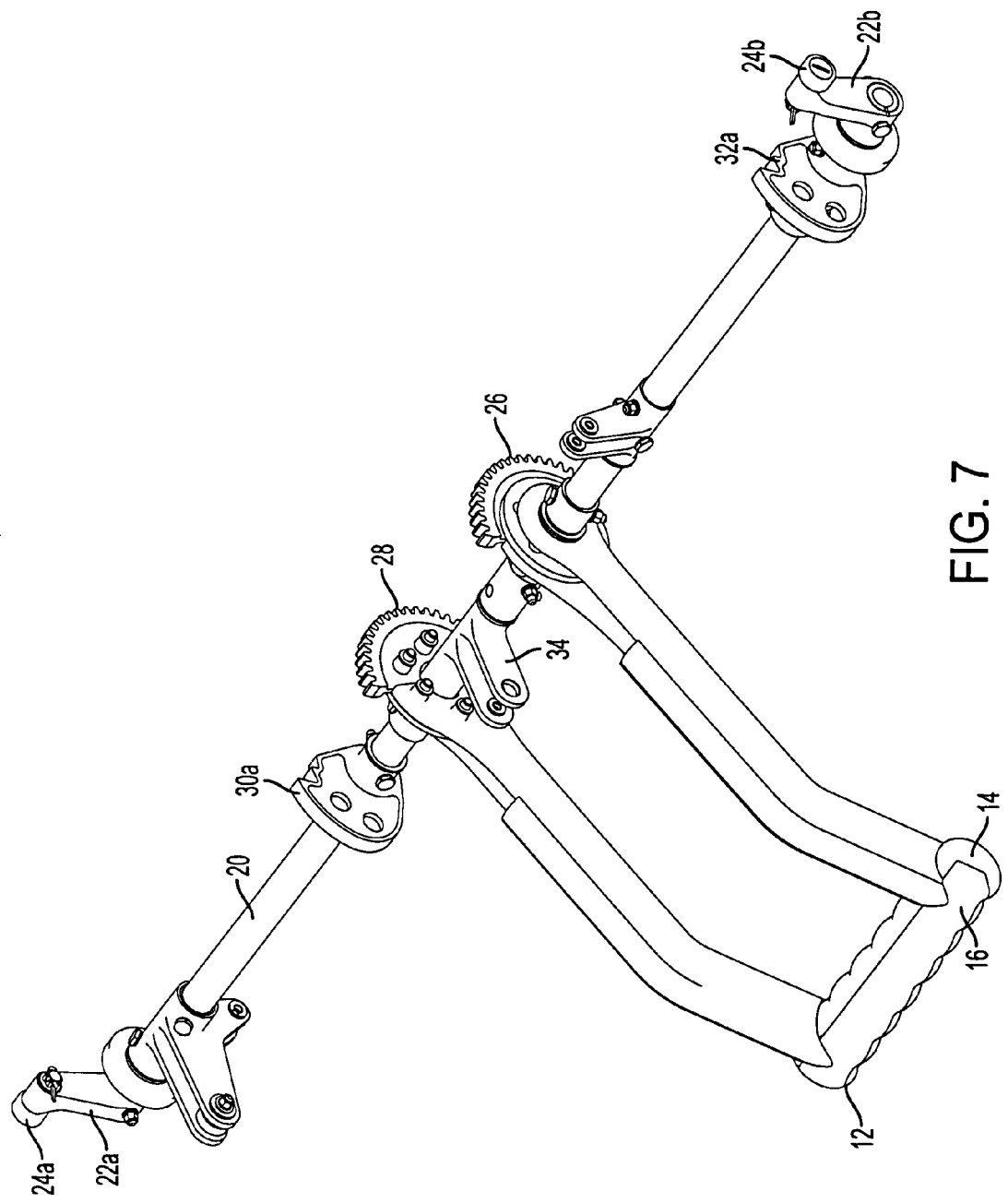
FIG. 7 is an isometric view of the assembly of FIG. 2A in isolation.
Figure 8A:
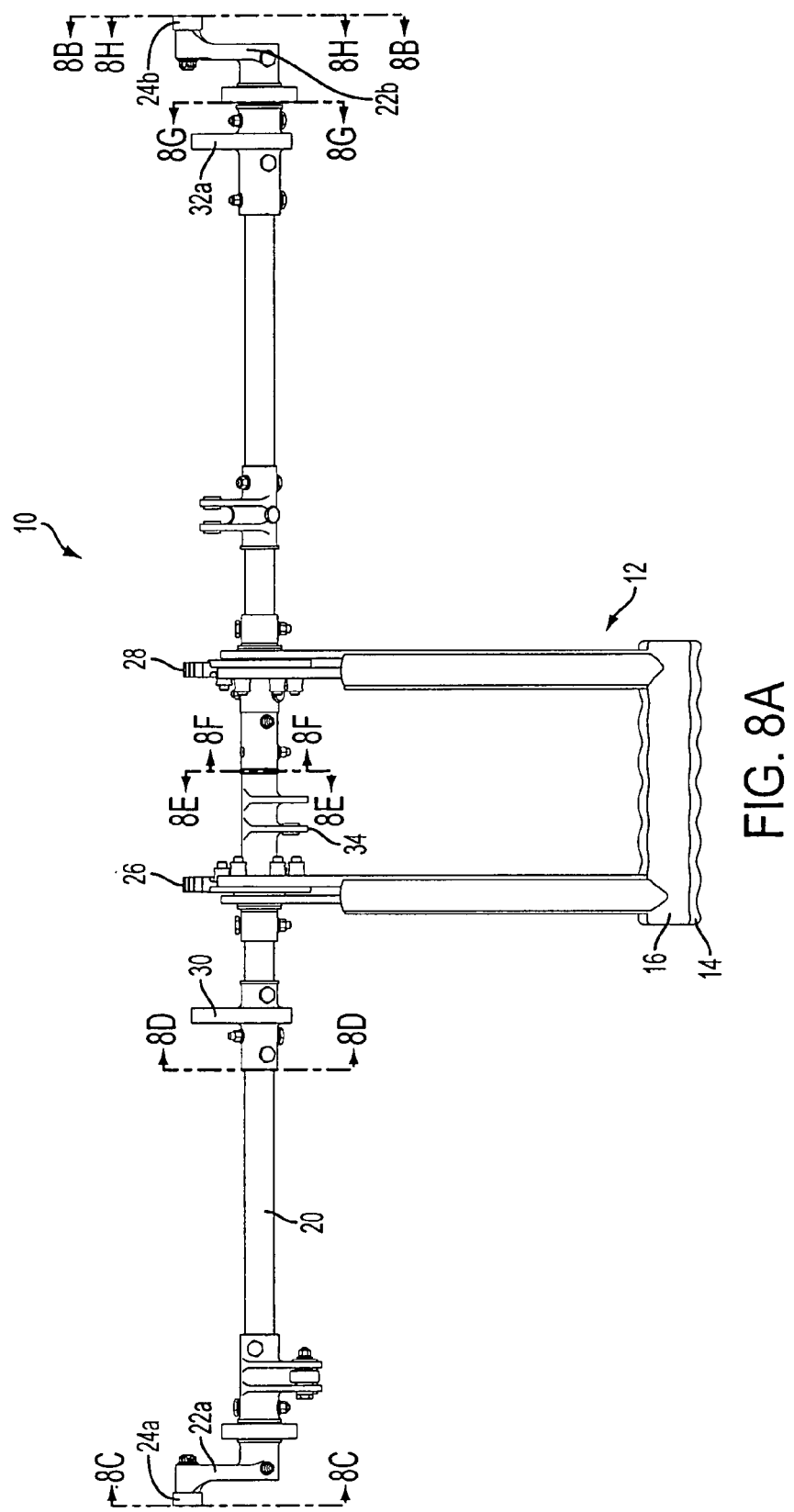
FIG. 8A is a plan view of the assembly of FIG. 7.
Figure 8B:
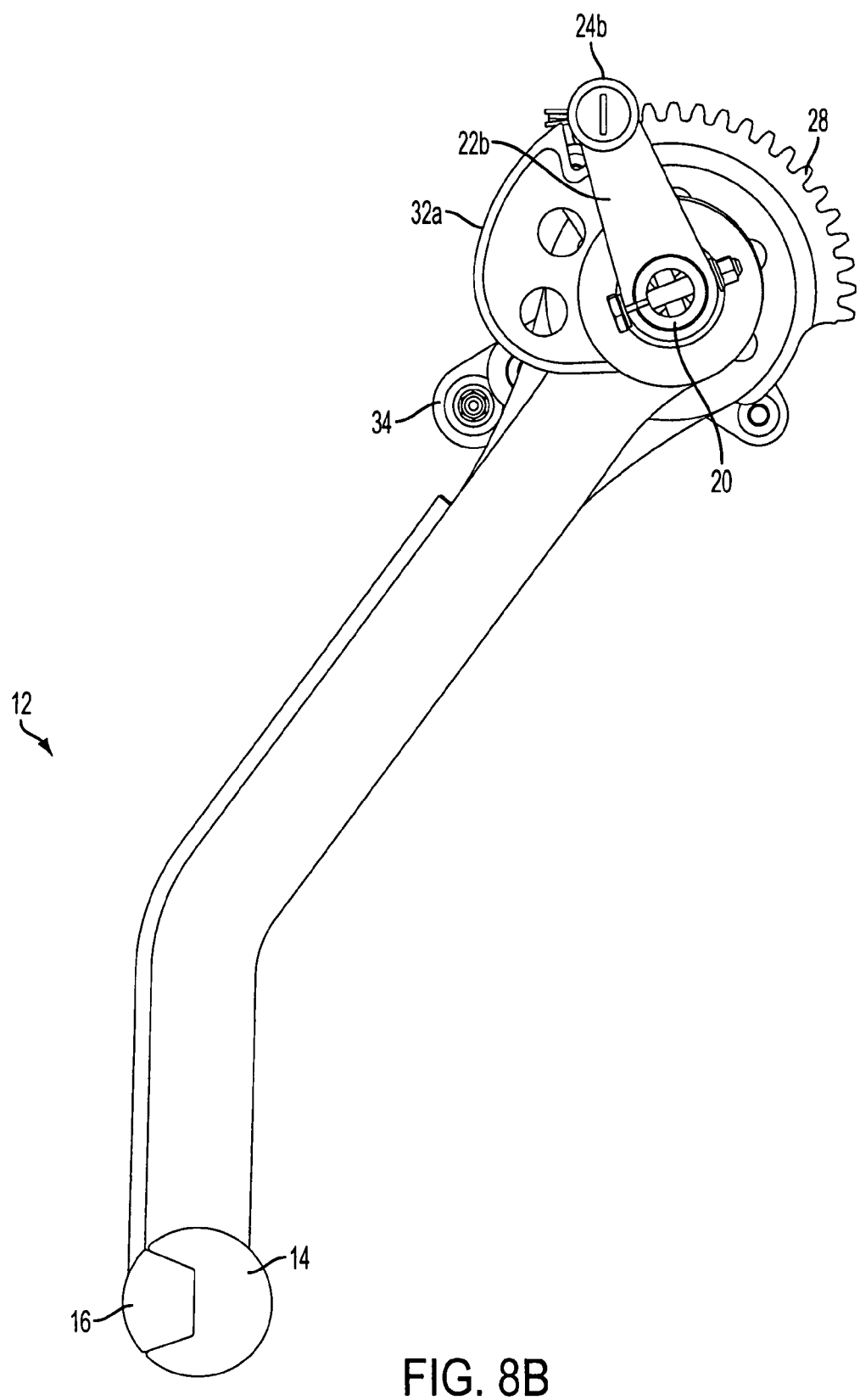
FIG. 8B is a side view of the assembly of FIG. 8A.
Figure 8C:
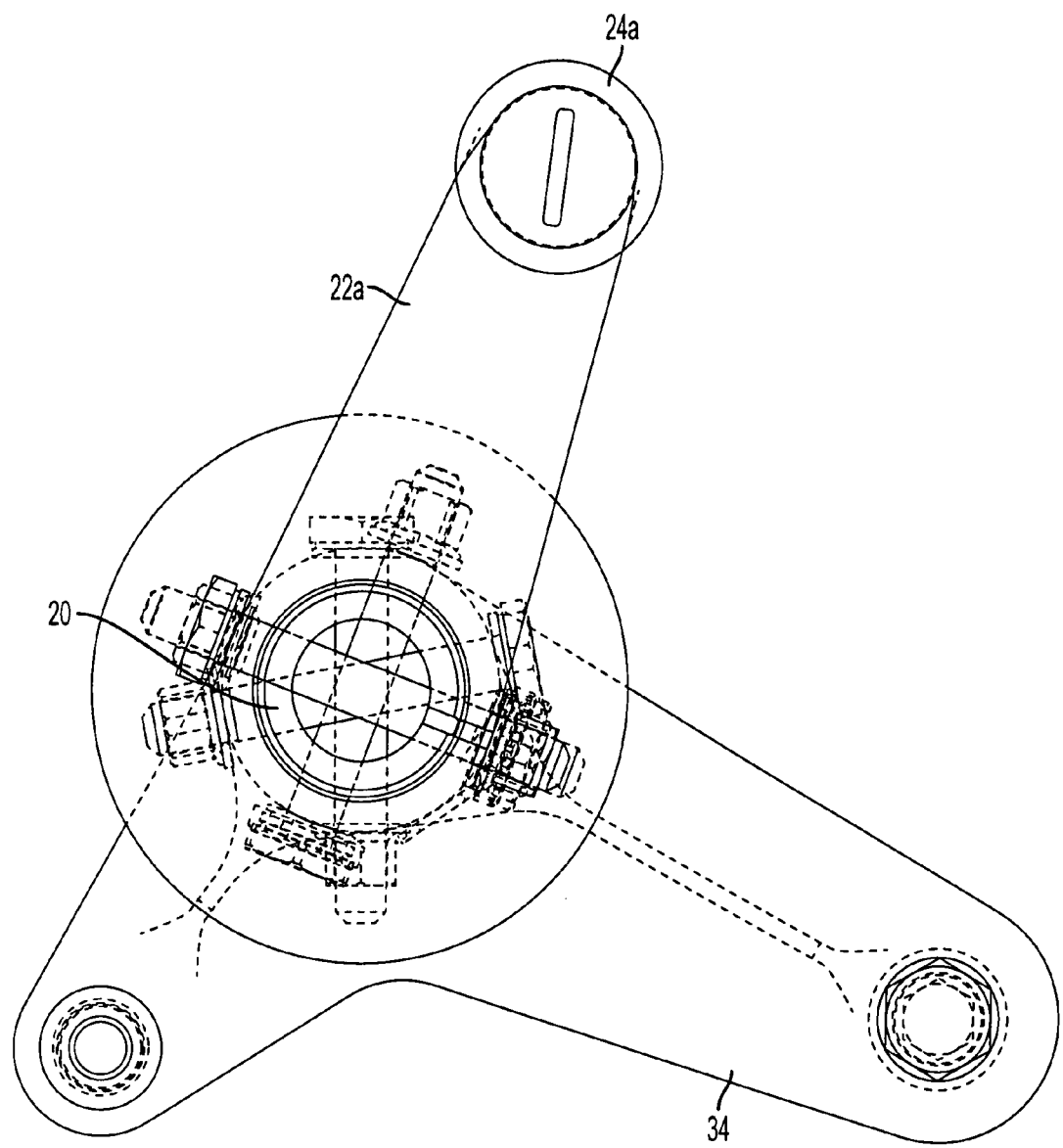
FIG. 8C is a side view of the assembly of FIG. 8A, seen along lines 8C-8C.
Figure 8D:
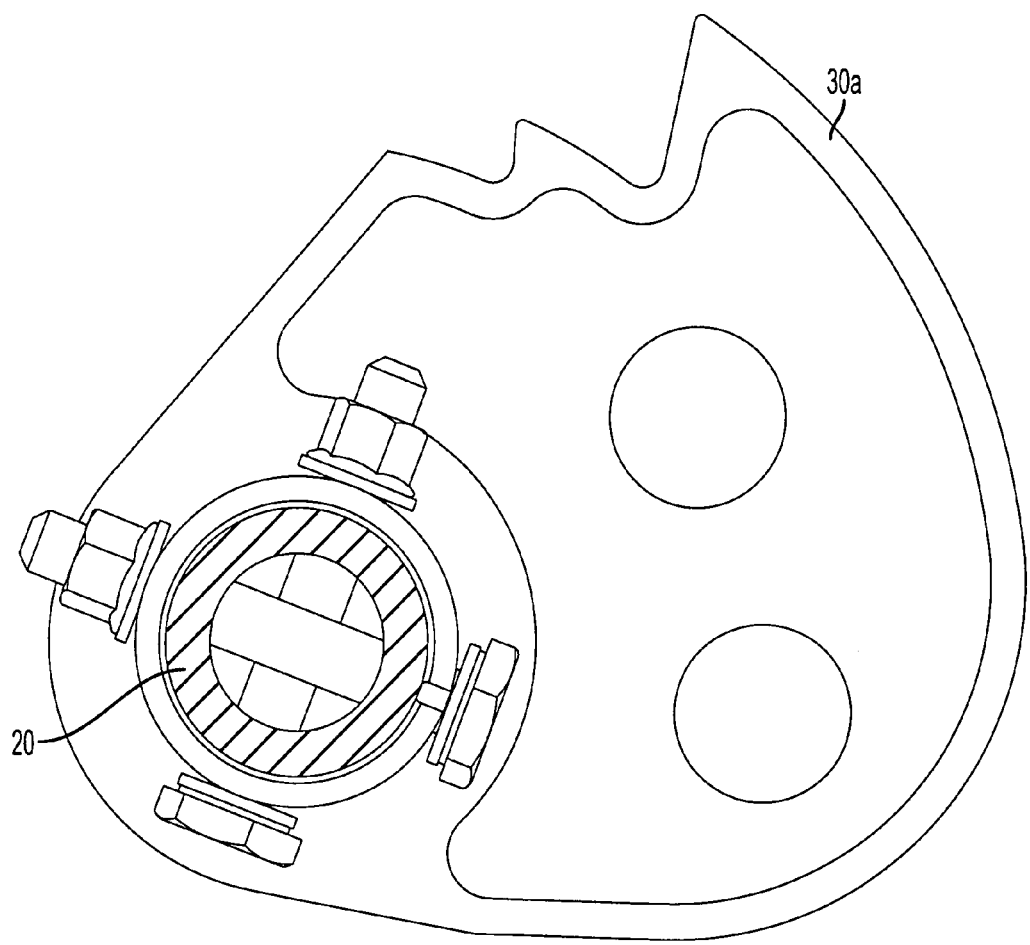
FIG. 8D is a side view of a component of the shaft assembly of FIG. 8A, seen along lines 8D-8D.

FIGS. 1A and 2A show the assembly 10 with the handle 12 in a closed position. Handle 12 includes locking section 14 and latching or actuating section 16. The assembly 10 is shown connected to the aircraft door 15, but the structure of the aircraft surrounding the door is not shown. Those of ordinary skill in the art will appreciate the structure employed to support and engage the door and its associated latching mechanisms. Visible in these figures is main shaft 20, running the width of the door 15. As shown in FIG. 7, fixedly mounted on the ends of main shaft 20 are latching arms 22a and 22b, each including a corresponding roller 24a or 24b (shown in FIGS. 4, 8A, 8C, and 8H). Also mounted to main shaft 20 are lock arms 30a and 32a (see FIGS. 8D and 8G), which correspond to pivoting door locks 30 and 32, respectively. As shown in FIGS. 7, 8B, 8E, and 8F, sector gears 26 and 28 are attached to sections of the handle 12; in the example, gear 26 is fixed to locking section 14, and gear 28 is fixed to actuating section 16, which is in turn fixed to the main shaft 20.

When handle 12 is in a closed position as shown in FIGS. 1A and 2A, locks 30 and 32 are aligned with lock arms 30a and 32a, respectively, and should shaft 20 rotate through a specified range, lock arms 30a and 32a will engage the locks 30, 32 by interfering with the arms' 30a, 32a path of motion. When locking section 14 is moved, locks 30 and 32 are pivoted into non-engagement positions.

Figure 1B:
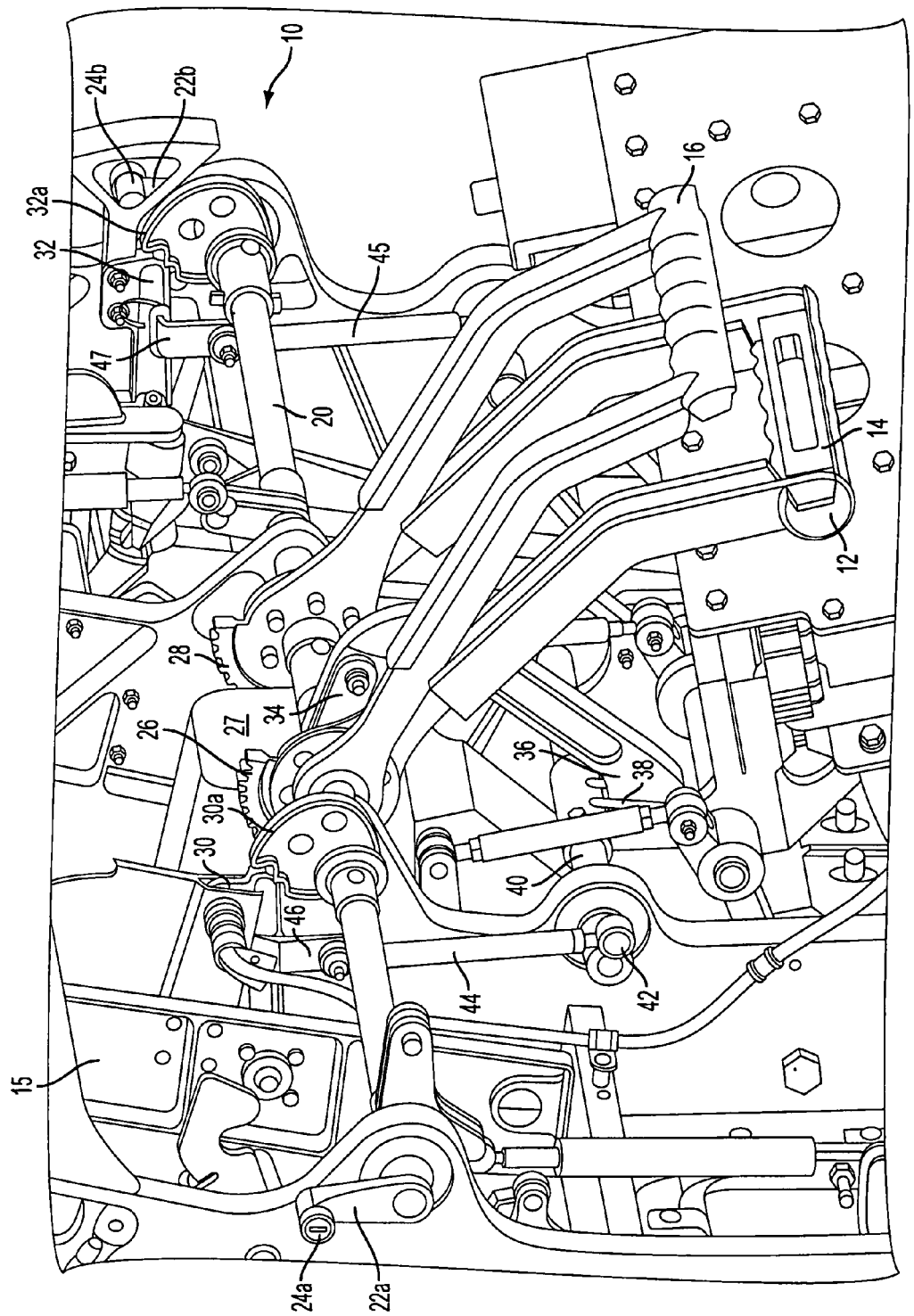
FIG. 1B is an isometric view of the assembly of FIG. 1A, showing a section of the handle lifted.

When an operator desires to open the door, the operator pulls upward on handle 12, thus moving both sections 14 and 16 of the handle together or substantially in unison. As shown in FIGS. 1A, 2A, 5, and 6, the motion of locking section 14 is transferred by crank arm 34 (also shown in FIGS. 7 and 8C) to connecting rod 36, which itself connects to bell crank 38. As seen in FIGS. 1A and 1B, bell crank 38 is rigidly fixed to lock shaft 40. As locking section 14 is moved, lock shaft 40 rotates, turning bell cranks 42 and 43, located near opposite ends of lock shaft 40. Bell cranks 42 and 43 are pivotally connected to rods 44 and 45, respectively. Rods 44 and 45 are in turn connected to sliders 46 and 47, which are slideably connected to locks 30 and 32, respectively. As locking section 14 moves, sliders 46 and 47 force locks 30 and 32 to pivot out of the path of lock arms 30a and 32a.

Figure 8E:
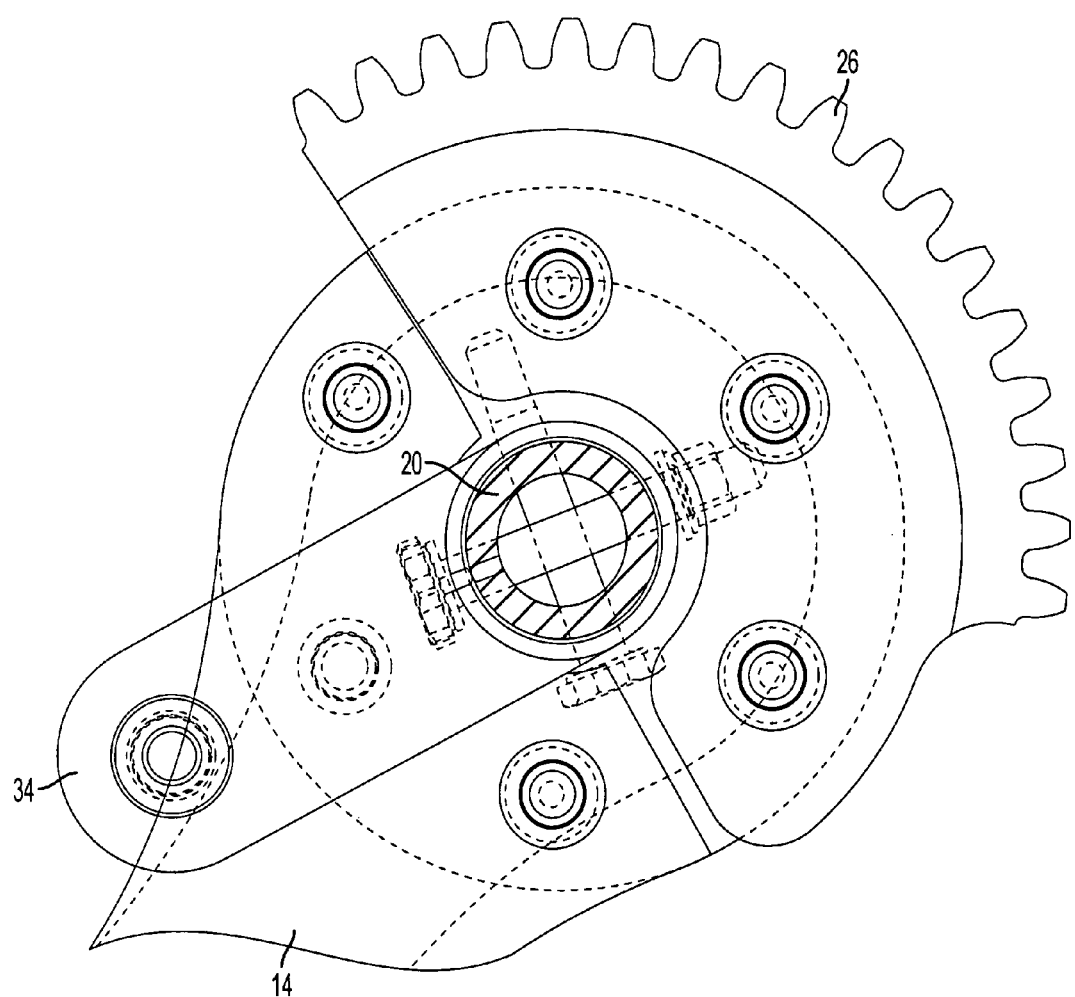
FIG. 8E is a side view of a component of the shaft assembly of FIG. 8A, seen along lines 8E-8E.
Figure 8F:
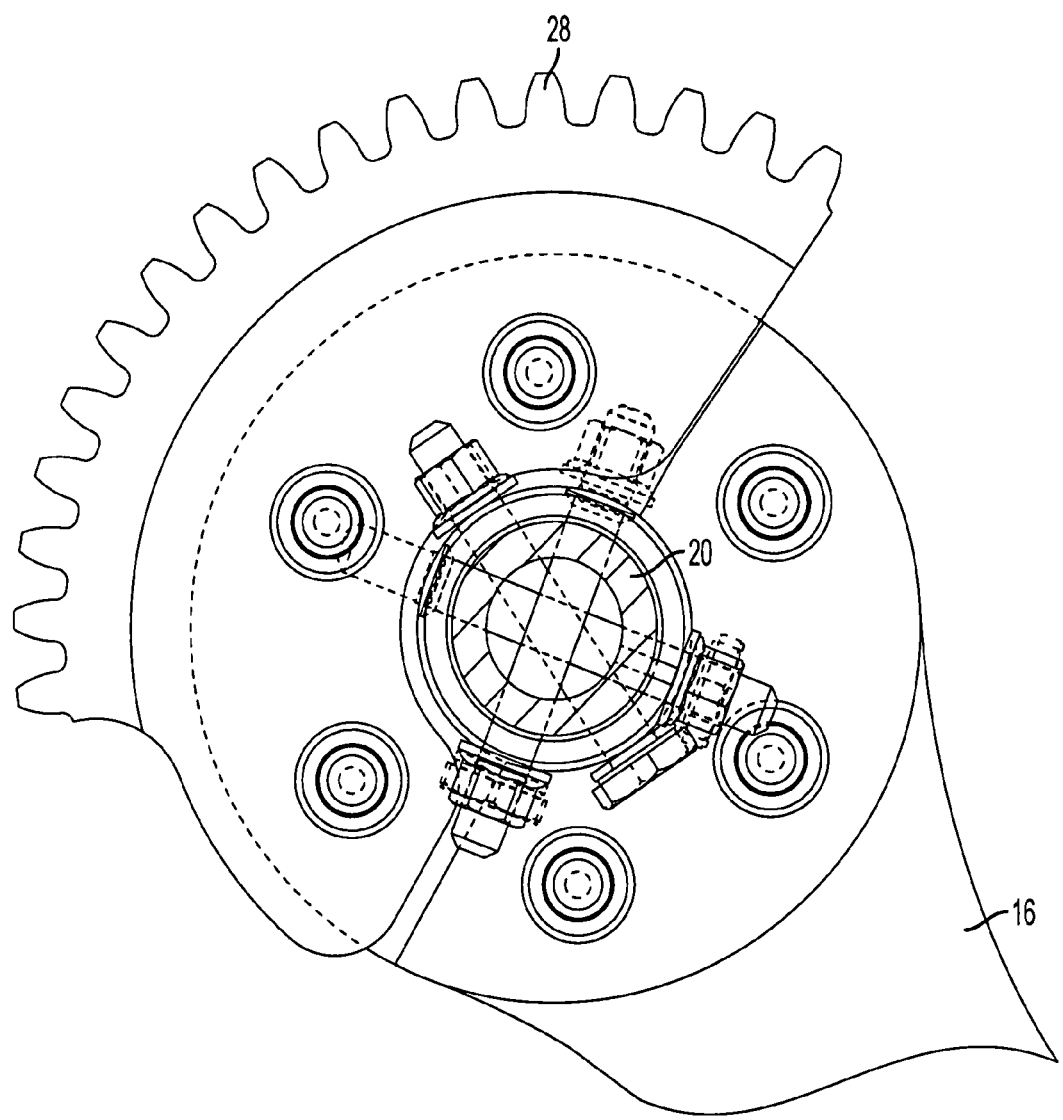
FIG. 8F is a side view of a component of the shaft assembly of FIG. 8A, seen along lines 8F-8F.
Figure 8G:
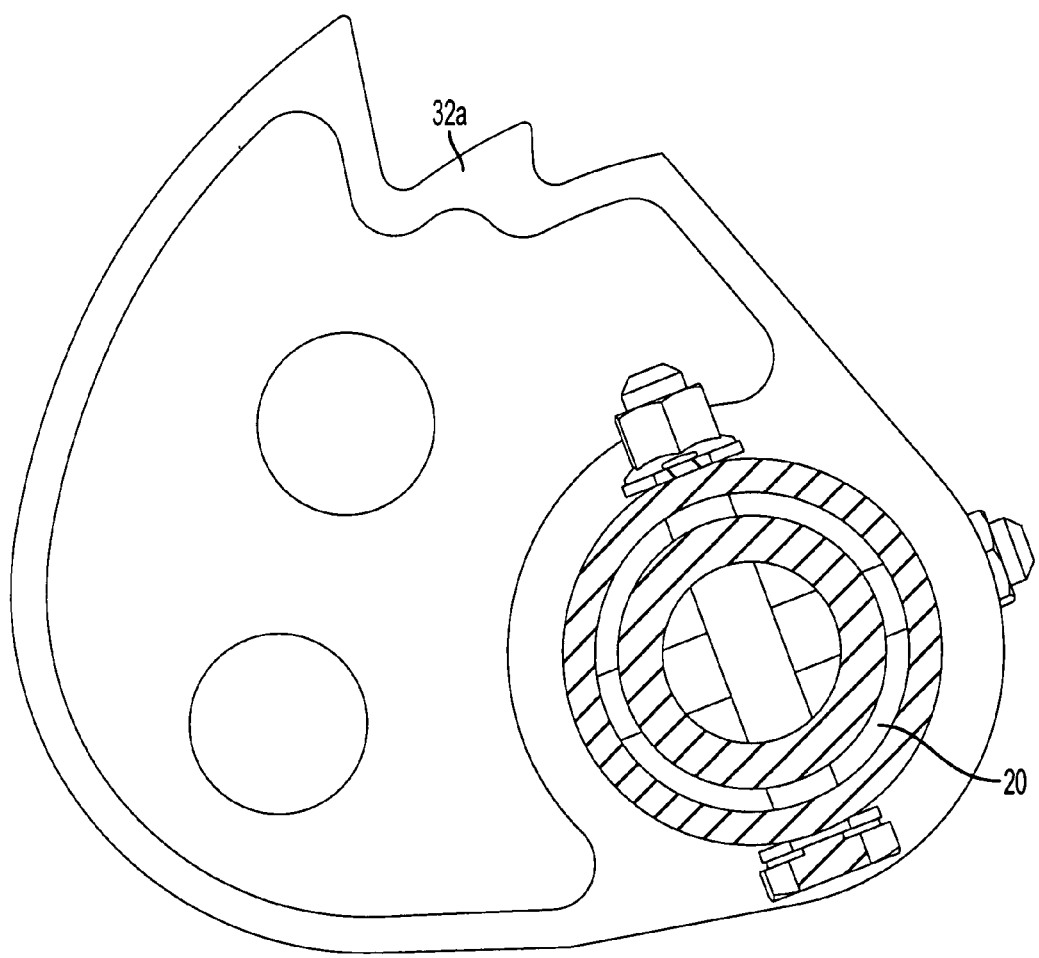
FIG. 8G is a side view of a component of the shaft assembly of FIG. 8A, seen along lines 8G-8G.
Figure 8H:
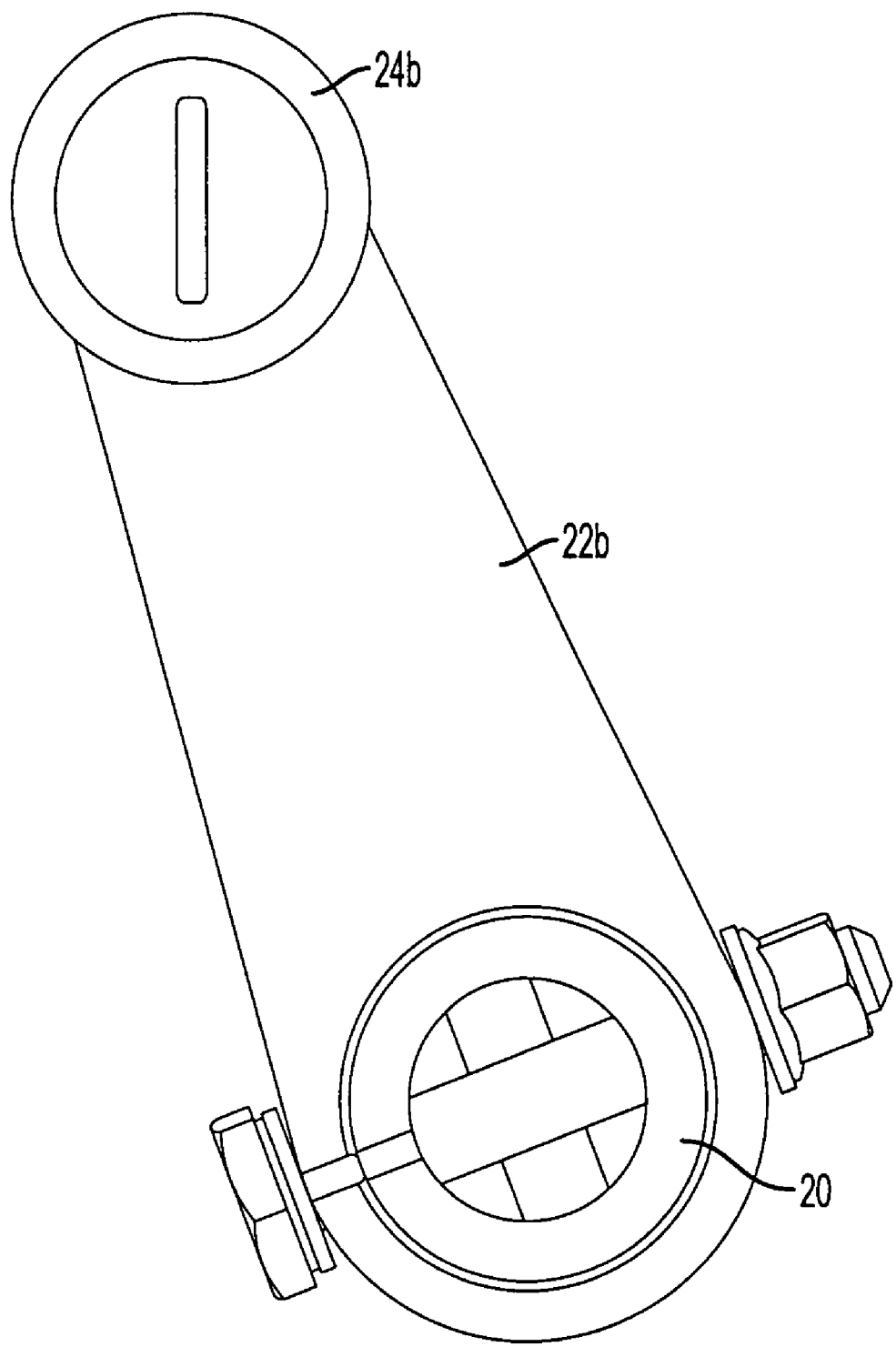
FIG. 8H is a side view of a component of the shaft assembly of FIG. 8A, seen along lines 8H-8H.

As handle 12 is raised, the motion of handle 12 causes actuators 26 and 28 to move. As seen in FIG. 2A, in this example the actuators can be sector gears 26 and 28 mounted to sections of the handle 12. However, the actuators may include other types of force-transfer components, such as mechanical linkages, or solenoids or other electronic signal actuation. As shown in FIGS. 8E and 8F, gear 26 is fixed to locking section 14, and gear 28 is fixed to actuating section 16. As the handle 12 is moved to a predetermined angle, gears 26 and 28 engage corresponding vent door gears 26a (not visible) and 28a, respectively. The motion of the vent door gears 26a and 28a causes the vent door 27 to open as the main shaft 20 rotates. Opening the vent door 27 equalizes any pressure differential across the door 15 before the door 15 is disengaged from the aircraft structure, thus preventing a sudden uncontrolled opening. Also, positive actuation of the vent door 27 also prevents malfunction of the vent door due to icing or other adverse conditions by providing an active, rather than passive, opening force, such as a spring. As the operator continues to raise the handle 12, the latching rollers 24a and 24b rotate and lift the door 15, disengaging from the aircraft structure and allowing the door 15 to be opened. As seen in the example depicted in FIGS. 1A, 1B, 2A, and 2B, the handle 12 may also include additional linkages to further movable components of the door 15. It is contemplated that such components may include additional locking or latching mechanisms, or other mechanisms necessary or desirable for safe operation of the aircraft. The presence or absence of such additional linkages does not affect the operation of the invention described herein.

In order to secure the door, the operator moves the door into a closed position and pulls downward on the handle 12, causing shaft 20 to rotate. As shaft 20 rotates, latching rollers 24a and 24b engage the aircraft structure, pulling door 15 into a closed and latched position. In the example, after rollers 24a and 24b engage the aircraft structure, sector gears 26 and 28 engage door vent door gears 26a (not shown) and 28a, and cause the vent door (not shown) to close, thus allowing the aircraft to be pressurized for flight. As the shaft 20 continues to rotate, locks 30 and 32 pivot into an engaged position with respect to lock arms 30a and 32a, respectively. When handle 12 is returned to its fully-lowered position, the door is secured for takeoff.

Figure 2B:
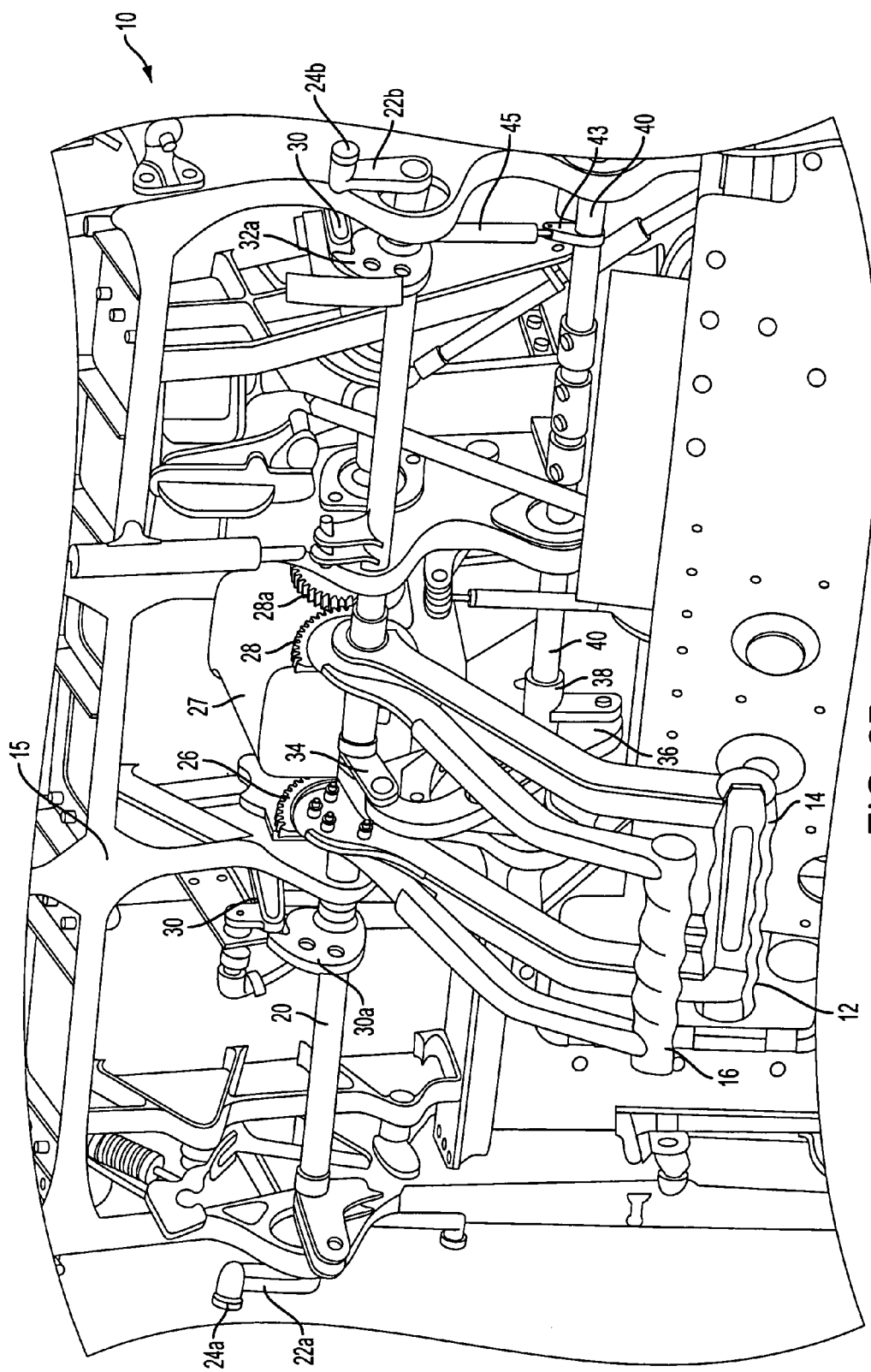
FIG. 2B is an isometric view of the assembly of FIG. 2A, showing a section of the handle lifted.
Figure 3:
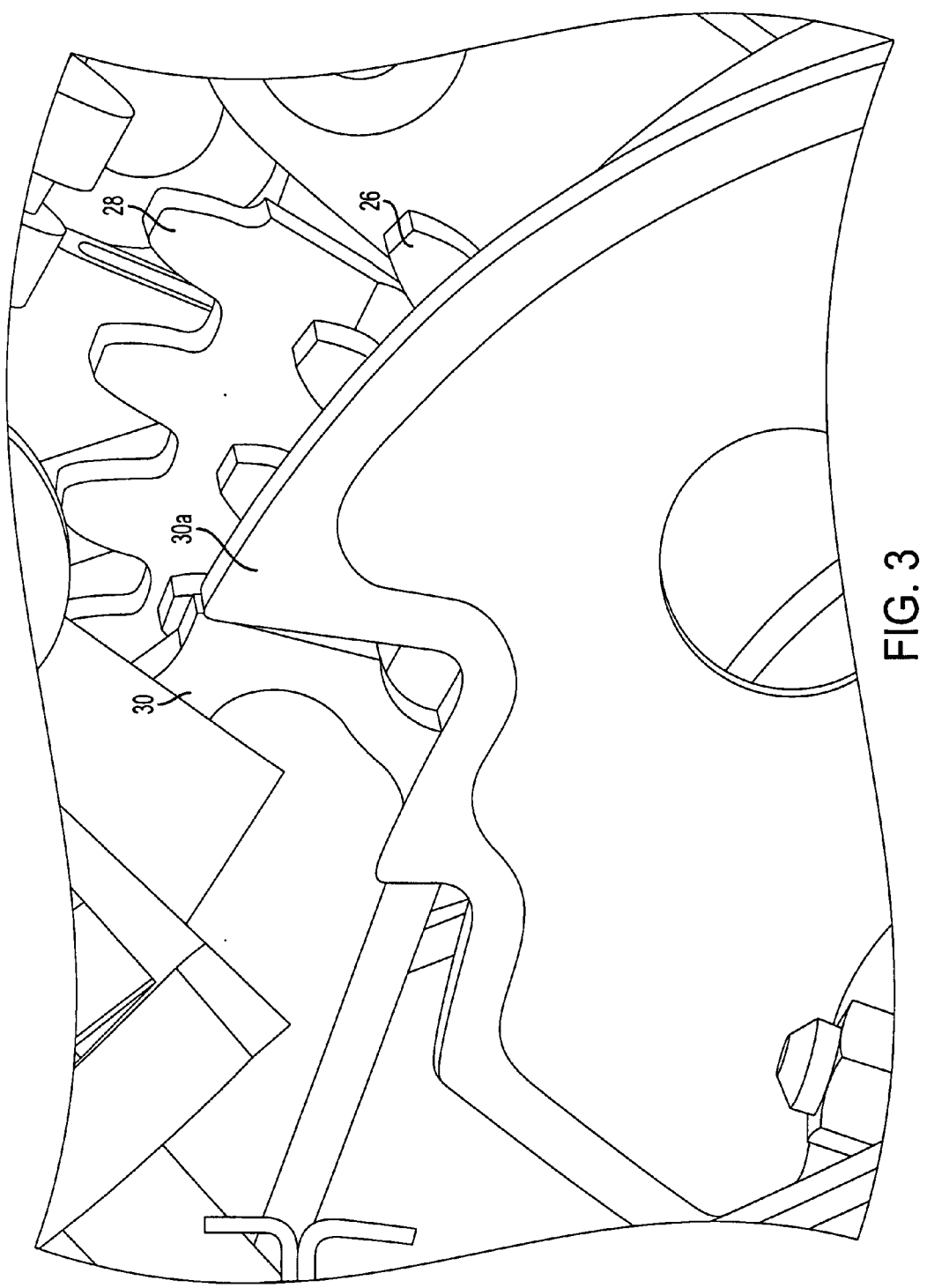
FIG. 3 is an enlarged isometric view of a component of the assembly of FIGS. 1A and 1B, showing the component engaged with the door lock.
Figure 4:
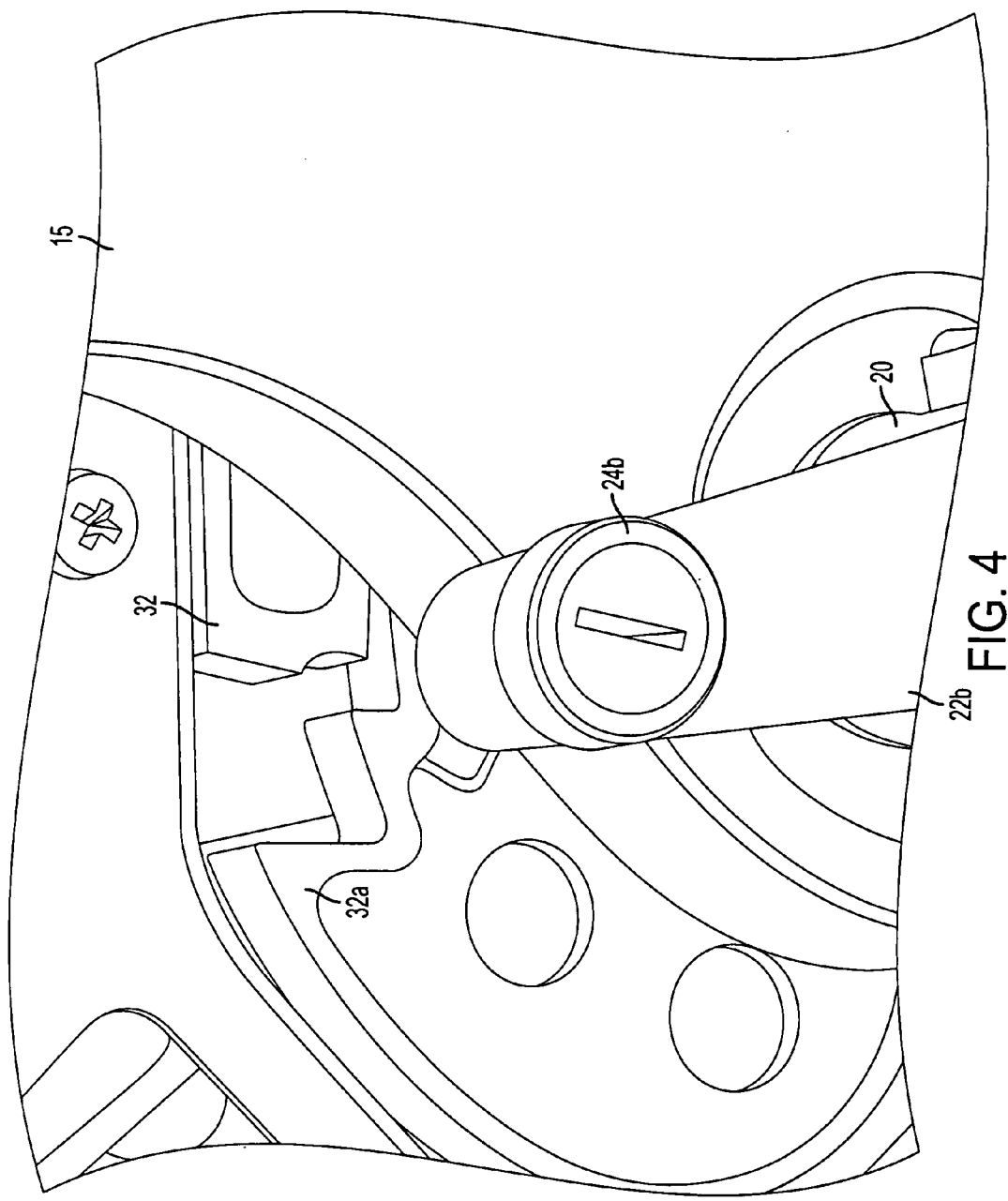
FIG. 4 is an enlarged isometric view of a component of the assembly of FIGS. 1A and 1B, showing the component engaged with the door lock.
Figure 5:
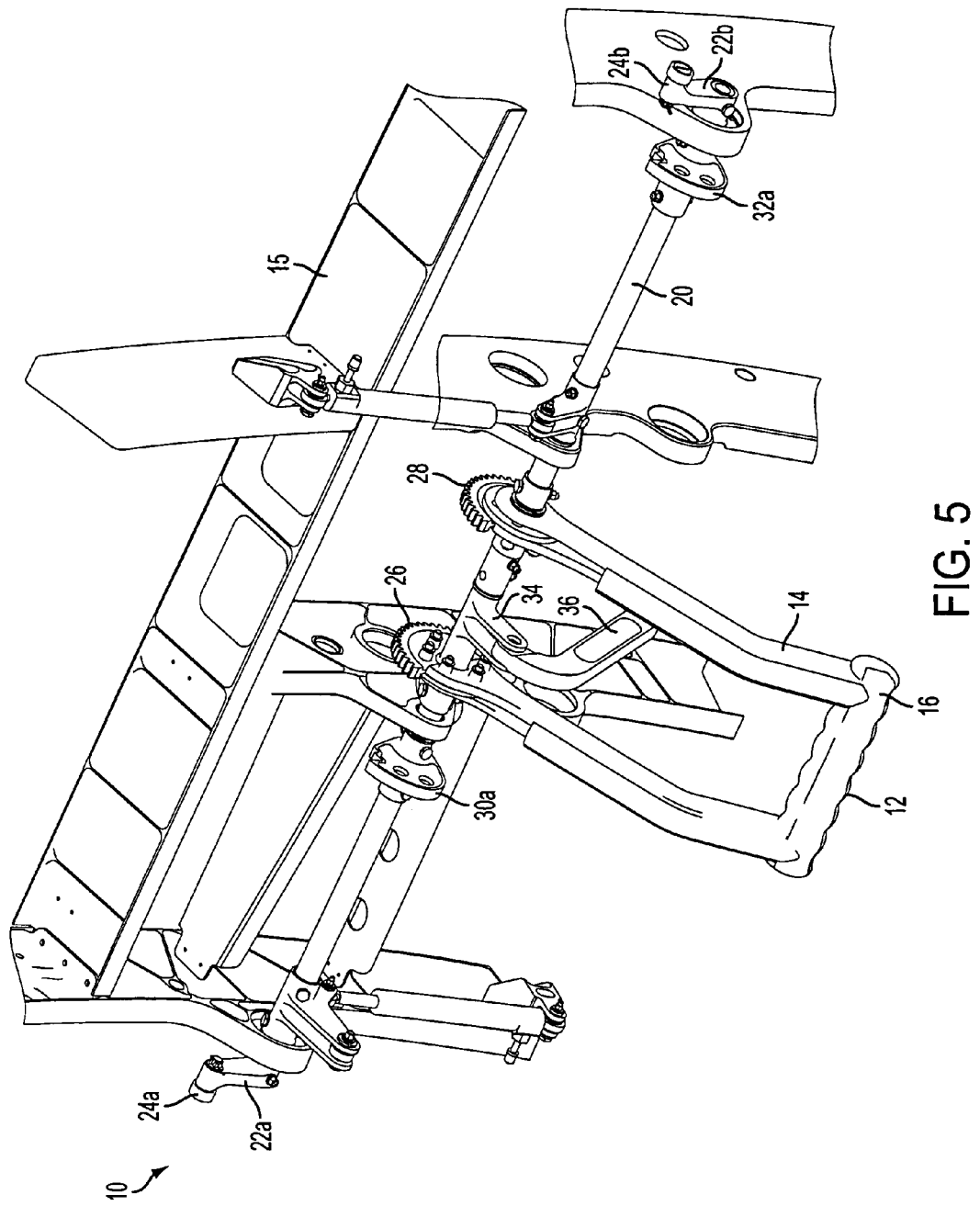
FIG. 5 is an isometric view of the assembly of FIG. 2A, shown with less surrounding structure.
Figure 6:
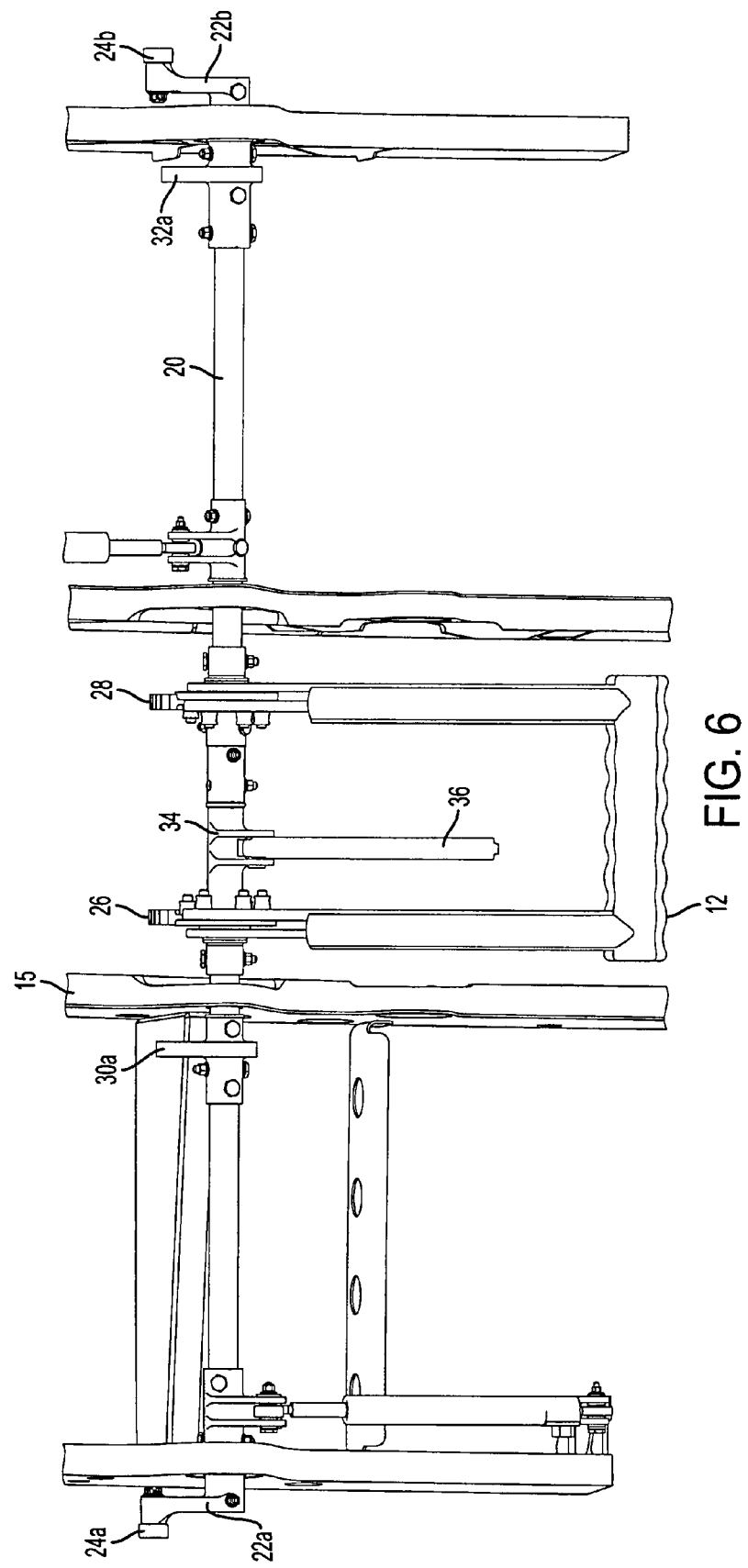
FIG. 6 is a plan view of the assembly of FIG. 1A.

FIGS. 1B, 2B, 3, and 4 show the operation of the locks when only actuating section 16 is moved a predetermined number of degrees of rotation from locking section 14. In the illustrative example, actuating section 16 is moved, while locking section 14 remains stationary. If a failure or disruptive condition such as vibration occurs in the door and causes the actuating section 16 to rotate, the locks 30 and 32 will prevent the venting or opening of the door, because the vent and locks are operated by the motion of the locking section 14. In the example, actuating section 16 is capable of a small amount of movement before the gears 26 and 28 engage their complementary door components 26a (not shown) and 28a, shown in FIGS. 2A and 2B. While the example preferably limits actuating section 16's separate rotation to approximately 20 degrees, it will be appreciated by those of skill in the art that a particular range of motion is not a limitation on the invention. As actuating section 16 moves, main shaft 20 begins to rotate. As shown in FIGS. 3 and 4, lock arms 30a and 32a engage locks 30 and 32, respectively, once shaft 20 rotates through a certain range. Locks 30 and 32 engage arms 30a and 32a because locking section 14 has not moved; thus, locks 30 and 32 have not been pivoted out of the path of arms 30a and 32a. Therefore, main shaft 20 is prevented from rotating any further, and latching arms 22a and 22b are prevented from moving rollers 24a and 24b out of engagement with the aircraft structure. As a result, the door cannot be opened. Also, as seen in FIGS. 1B and 2B, if locking section 14 is not moved with actuating section 16, the vent door 27 of the example cannot be opened, for two reasons. First, the locks 30 and 32 prevent rotation of the main shaft and engagement and rotation of the vent door gears 26a and 28a by sector gears 26 and 28. Second, because sector gear 26 and sector gear 28 are mounted to different sections of the handle 12, the vent door 27 cannot be opened unless both gear sets are engaged, which can require movement of both handle sections.

It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A door operating assembly for operating a door, the assembly comprising:
   a rotatable main shaft mounted on the door, the shaft having at least one lock arm acting as an interfering element mounted to it at least one portion of the shaft;
   wherein the door comprises a locking mechanism aligned with the interfering element;
   the door operating assembly further comprising:
   a handle assembly, comprising:
      first and second handle sections, movable independently of each other, and mounted to the shaft which rotates to facilitate unlocking and locking of the door, the second handle section being operatively connected to the locking mechanism via a linkage;

wherein:
    the locking mechanism prevents rotation of the shaft by interfering with the interfering element when the first handle section moves a predetermined distance with respect to the second handle section, to prevent unlocking of the door; and
    the shaft further comprises at least one latching element at an end of the shaft operatively connected to a latch on the door that is movable to an unlock position when the first handle section and the second handle section are adjacent to one another and move together.

2. The handle assembly of claim 1, wherein:
the first and second handle sections are rotatable about an axis; and
the locking mechanism prevents rotation of the shaft when the first handle section rotates about the axis by a predetermined amount with respect to the second handle section.

3. The handle assembly of claim 2, wherein the axis is the axis of the shaft.

4. The handle assembly of claim 2, wherein;
the first and second handle sections are rotated about the axis in a first direction of rotation to unlock the door and a second direction of rotation to lock the door.

5. The handle assembly of claim 4, wherein:
the first and second handle sections are rotated substantially in unison in the first direction of rotation to unlock the door.

6. The handle assembly of claim 1, wherein:
the first and second handle sections are configured to rotate the shaft; and
the locking mechanism is configured to prevent further rotation of the shaft when the first handle section rotates the shaft by a predetermined angle with respect to a position of the second handle section.

7. The handle assembly of claim 6, wherein the locking mechanism is movable between an interference position where the locking mechanism engages to prevent the first handle section from further rotating the shaft and a non-interference position where the locking mechanism permits the first handle section to further rotate the shaft.

8. The handle assembly of claim 7, wherein rotation of the second handle section moves the locking mechanism between the interference and non-interference positions.

9. The handle assembly of claim 8, wherein the locking mechanism is coupled to the second handle section via a mechanical linkage.

10. The handle assembly of claim 9, wherein the mechanical linkage includes a series of bell cranks and connecting rods.

11. The handle assembly of claim 1, wherein the locking mechanism includes at least one arm mounted to the shaft.

12. The handle assembly of claim 1, wherein the assembly includes at least one actuator adapted to engage at least one movable component of the door.

13. The handle assembly of claim 12, wherein the at least one actuator includes a sector gear mounted to a section of the handle.

14. The handle assembly of claim 12, wherein the at least one actuator includes a sector gear mounted to the shaft.

15. A method for using a door operating assembly to operate a door, wherein the door operating assembly comprises a main shaft mounted on the door and having at least one latching element at an end of the shaft, at least one door lock mounted to the door, and at least one lock arm mounted to the shaft and aligned with the door lock, and a handle assembly that comprises a first and second handle section, mounted to the shaft and movable independently of each other, the second section being operatively connected to the door lock, the method comprising:
    substantially moving the first and second sections at the same time, so that the second section can move the door lock out of the moving path of the lock arms so that the door operating assembly can move the latching element to the unlock position and allow the door to be opened;
    engaging a locking mechanism to prevent further rotation of the shaft in the first rotational direction by an interference element fixed to the shaft when the first handle section moves a predetermined distance with respect to the second handle section, to prevent unlocking of the door.

16. The method of claim 15, wherein:
the first and second handle sections are rotatable about an axis; and
the operating step operates the locking mechanism to prevent rotation of the shaft when the first handle section rotates about the axis by a predetermined about with respect to the second handle section.

17. The method of claim 15, wherein:
the rotation of the shaft in the first direction by a predetermined amount causes a latching mechanism to operate to allow the door to open, and wherein rotation of the shaft in the second direction by a predetermined amount causes a latching mechanism to operate to secure the door in a closed position.

18. The method of claim 15, wherein the movement step further comprises:
    operating at least one actuator, the actuator engaging at least one movable component of the door when the first and second handle sections are moved substantially in unison.

19. The method of claim 15, wherein:
the locking mechanism operating step includes selectably pivoting a lock between an interference position and a non-interference position with respect to a portion of the shaft.

20. An aircraft including the handle assembly of claim 1.

21. A door operating assembly to operate a door, the assembly comprising:
    a rotatable main shaft mounted on the door and having a latch element;
    at least one movable door lock mounted to the door;
    at least one lock arm mounted to the shaft so as to be aligned with the door lock; and
    a handle assembly that comprises:
        a first and a second handle section coupled to the shaft and movable independently from each other,
    wherein:
        the second section is operatively connected to each door lock via a linkage such that:
            if the first section is moved to a predefined distance from the second section, the door lock prevents the main shaft from further rotation, and
            if both sections are substantially moved at the same time, the second section moves the door lock out of a moving path of the lock arm so that the handle section can then move the latch element to the unlock position, permit rotation of the shaft, and allow the door to be opened.

22. A method for using a door operating assembly to operate a door, wherein the door operating assembly comprises:

a rotatable main shaft mounted on the door and having a latch element;
at least one movable door lock mounted to the door,
at least one lock arm mounted to the shaft so as to be aligned with the door lock, and
a handle assembly that comprises a first and a second handle section coupled to the shaft and moving independently from each other, the second section being operatively connected to the door lock via a linkage, the method comprising:
substantially moving both sections at the same time, so that the second section can move the door lock out of a moving path of the lock arm so that the handle assembly is then capable of moving the latch element to the unlock position, permitting rotation of the shaft, and allowing the door to be opened.

* * * * *